Patented July 10, 1928.

1,676,612

UNITED STATES PATENT OFFICE.

RICHARD L. KRAMER, OF WILMINGTON, DELAWARE, ASSIGNOR TO E. I. DU PONT DE NEMOURS & COMPANY, OF WILMINGTON, DELAWARE, A CORPORATION OF DELAWARE.

CELLULOSE-ESTER COMPOSITION.

No Drawing.    Application filed September 6, 1924.   Serial No. 736,367.

This invention relates to cellulose ester, particularly cellulose nitrate, compositions containing a softener, and has particular relation to the manufacture of artificial leather of which films or layers of pyroxylin constitute an essential part. By "softener" I of course mean a material imparting flexibility to the film and of such low volatility that said material will remain for a long period as a constituent of the pyroxylin coating or film of which it originally formed a part. Of the softeners heretofore used castor oil is a typical example. A difficulty with it is that it is subject to oxidation and develops rancidity, making it far from wholly satisfactory.

One object of the present invention is to provide cellulose ester compositions which can be used for coating woven fabrics to produce artificial leather or fabrikoid having great durability and pliability and with a film not liable to the various faults, as rancidity development, cold cracking and so on, of previous films. A further object is to provide an artificial leather having the desirable characteristics mentioned. To these ends, and also to improve generally upon compositions, coatings, and artificial leathers, the invention consists in the following matters hereinafter described and claimed.

I have found that aryloxy-ethanol esters of carboxylic acids are highly satisfactory softeners, having excellent softening properties, not exuding from the film during embossing, and giving films of proper pliability and wearing qualities. Of the various esters particular mention is made of beta-phenoxy-ethyl phthalate, beta-methyl-phenoxy-ethyl phthalate, and beta-methyl-phenoxy-ethyl laurate.

As a specific example illustrating my invention, but without restricting the same thereto, the following is given as a specimen composition (parts by weight) :—
Pyroxylin, 1.00; beta - phenoxy - ethyl phthalate, .75–2.0 (preferably 1.37); pigment, .62; volatile solvent, 11.00.

In using beta - methyl - phenoxy - ethyl phthalate the same proportions may be used as above, while in using beta-methyl-phenoxy-ethyl laurate the range may be .75–2.20. The pigment may be any of the usual pigments, as zinc oxide for white goods. The solvent may be any suitable one as 95% ethyl alcohol 50, ethyl acetate 50. As will be understood, the proportions of pigment and solvent may be varied as desired to meet particular conditions and as well understood in the art. The composition may be applied to the goods, in the production of artificial leather, in accordance with the general practices of the art, the present softeners introducing no complications into coating practices.

The substances specifically mentioned above may be prepared as follows:—

*Beta-phenoxy-ethyl phthalate.*—Heat together in a flask 100 grams of beta-phenoxy ethanol (Bentley, Haworth and Perkin, J. Chem. Soc., 69, (1896) 164) and 54 grams of phthalic anhydride, on a steam bath for 4 hours. Pass HCl gas through for 15 minutes. Again heat on steam bath for 2 hours; pass HCl gas through for 15 minutes; transfer flask to oil bath and heat at 115°–120° C. for 4 hours. Transfer flask to steam bath and heat continuously for 2 days to drive off the last traces of hydrogen chloride. Wash product with water and then with sodium carbonate solution until neutralized. Again wash twice with water, and separate. The compound is a solid substance at 20° C.

*Beta-methyl - phenoxy - ethyl phthalate.*—Heat together in a flask 100 grams of beta-methyl-phenoxy ethanol (Boyd and Marle, J. Chem. Soc., 105, (1914) 2133), ortho or meta being satisfactory, or a mixture of para with the others, the solid para being soluble in the others, and 49 grams of phthalic anhydride for 4 hours on a steam bath. Pass HCl gas through for 15 minutes. Again heat on steam bath for 2 hours; pass HCl gas through for 15 minutes; transfer flask to oil bath and heat at 115°–120° C. for 4 hours. Transfer to steam bath and heat continuously for 2 days to drive off last traces of hydrogen chloride. Wash product with water and then with sodium carbonate solution until neutralized. Again wash twice with water, and separate. The compound is a viscous liquid at 20° C. with a slight but pleasant odor.

*Beta-methyl-phenoxy-ethyl laurate.*—Heat together in a flask 20 grams of beta-methyl-phenoxy ethanol and 27 grams coconut oil acids by oil bath. When temperature of bath reaches 127° C. start a stream of nitrogen bubbling through the mixture to sweep out water of estrification and continue the heating under these conditions until the product is almost neutral, wash with salt water, filter, and, if desired, decolorize with any suitable agent as decolorizing charcoal. The compound is a liquid which begins to freeze at about −1.° C. and has a viscosity about equivalent to that of liquid coconut oil.

The phthalates may also have application as softeners for laquers, photographic films, and so on and be used in the presence of a resin, in which case the proportions of softener to pyroxylin may be 0.30–.80 to 1. As indicated above derivatives of naphthol and xylenol may also be used as softeners. In those cases where there is danger of the selected softener acting as a precipitant it may be mixed with a suitable solvent softener as dibutyl phthalate.

In referring to phthalates herein, it will be understood that it is to the di- or neutral phthalates that particular reference is made.

It will be understood that other aryloxy-ethanol esters of carboxylic acids may be used in place of those esters previously mentioned. Compounds having an aryl nucleus with a hydroxyl group united directly with a carbon of the nucleus are, in general, suitable for use in preparing the desired esters. Naphthol $C_{10}H_7OH$ and its derivatives as well as the various phenoxy derivatives in which a hydrogen of the aryl ring has been replaced by a substituent atom or radical, are suitable. As a specific example, beta methyl naphthoxy ethanol,

$$CH_3C_{10}H_6O—CH_2—CH_2—OH$$

may be used in place of the other softeners.

It will be understood that many changes and variations may be made in the invention without departing from the scope thereof.

I claim—

1. A product comrising cellulose nitrate and as a softener therefor a carboxylic acid ester of an aryloxy ethanol.

2. A product comprising cellulose nitrate and as a softener therefor a phthalic acid ester of an aryloxy ethanol.

3. A product comprising cellulose nitrate and as a softener therefor a phenoxy-ethyl phthalate.

4. A product comprising cellulose nitrate and as a softener therefor methyl-phenoxy-ethyl phthalate.

5. A product comprising cellulose nitrate and methyl-phenoxy-ethyl phthalate in substantially the proportion of .75 to 2.0 parts of phthalate to 1 of pyroxylin.

6. A product comprising cellulose nitrate and methyl-phenoxy-ethyl phthalate in substantially the proportion of 1.37 parts of phthalate to 1 of pyroxylin.

7. A liquid coating composition comprising cellulose nitrate, volatile solvent therefor and as a softener for the nitrate a carboxylic acid ester of a phenoxy ethanol.

8. A liquid coating composition comprising cellulose nitrate, volatile solvent therefor, and a phenoxy-ethyl phthalate.

9. A liquid coating composition comprising cellulose nitrate, volatile solvent therefor, and methyl-phenoxy-ethyl phthalate.

10. An artificial leather comprising a fabric base having a film comprising cellulose nitrate and a carboxylic acid ester of a phenoxy ethanol as a softener for said film.

11. An artificial leather comprising a fabric base having a film comprising cellulose nitrate and a phenoxy-ethyl phthalate as a softener for the film.

12. An artificial leather comprising a fabric base having a film comprising cellulose nitrate and methyl-phenoxy-ethyl phthalate as a softener for the film.

13. An artificial leather comprising a fabric base having a film comprising cellulose nitrate and a carboxylic acid ester of an aryloxy ethanol as a softener for said film.

14. A liquid coating composition comprising cellulose nitrate, volatile solvent therefor, and as a softener for the nitrate a carboxylic acid ester of an aryloxy ethanol.

In testimony whereof I affix my signature.

RICHARD L. KRAMER.